Jan. 13, 1925. 1,522,537
J. F. O'CONNOR
FRICTION SHOCK ABSORBING MECHANISM
Original Filed Aug. 7, 1922 2 Sheets-Sheet 1
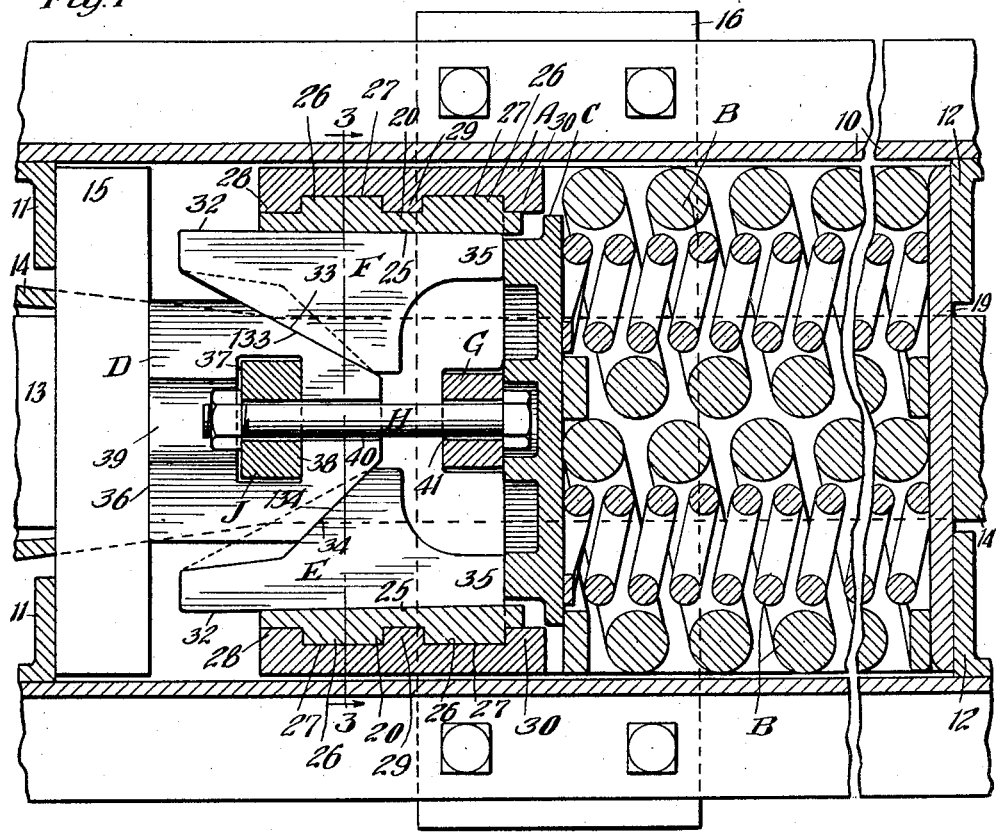

Jan. 13, 1925.                                                    1,522,537
J. F. O'CONNOR
FRICTION SHOCK ABSORBING MECHANISM
Original Filed Aug. 7, 1922      2 Sheets-Sheet 2
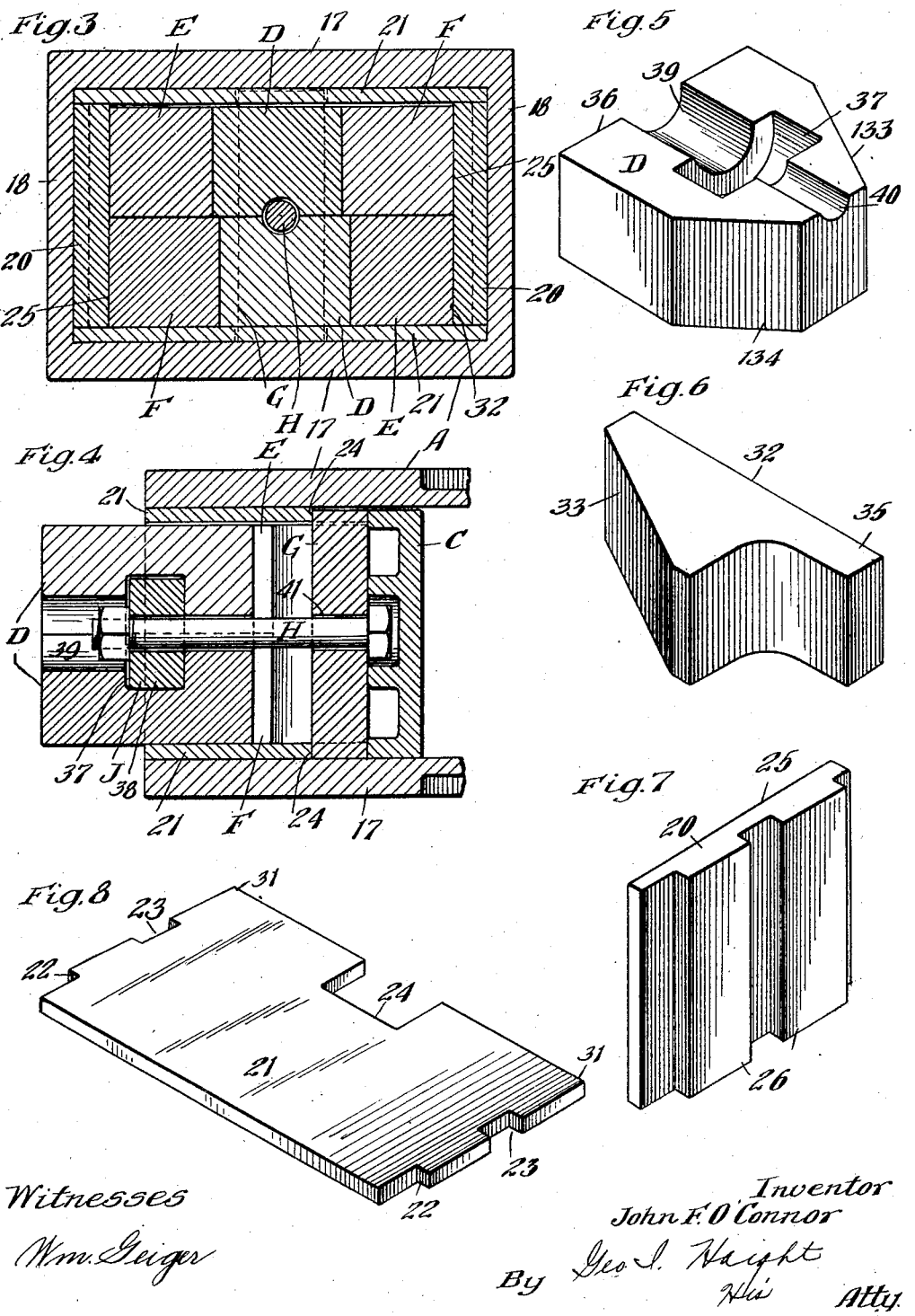

Patented Jan. 13, 1925.

1,522,537

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 7, 1922, Serial No. 580,007. Renewed June 7, 1924.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, especially adapted for railway draft riggings, wherein is obtained high capacity, the mechanism consisting of few parts and so arranged as to insure certain release.

Another object of the invention is to provide a friction shock absorbing mechanism of the character indicated wherein a keen angle wedging effect is obtained in compression and a blunt angle effect in release, thus permitting of substantially any desired high frictional capacity accompanied by certain release, and all without the necessity of anti-friction rollers, anti-friction pads or other corresponding expedients that have heretofore been deemed necessary.

A still further object of the invention is to provide a friction shock absorbing mechanism of the character indicated wherein are employed a friction shell, friction shoes, and spreading means, the friction shoes and spreading means having cooperating sets of engaging faces, certain of which produce a keen angle wedging action in compression and blunt, non-wedge-acting effect in release, and certain of which are of blunt, substantially non-wedge-acting effect in compression and wedge-acting effect in release.

A specific object of the invention is to provide a mechanism employing an arrangement of friction shoes and spreading means of the character indicated in the preceding paragraph wherein the sets of shoes and spreading means are so arranged as to neutralize or equalize any tendency of the elements of one set of devices to advance farther within the friction shell than another so as to insure a balanced spring pressure for the friction devices.

Other objects of the invention will more clearly appear from the description hereinafter following.

In the drawings forming a part of this specification, Figure 1 is a horizontal longitudinal sectional view of a portion of a railway draft rigging showing my improvements in connection therewith. Figure 2 is a front end elevation of the shock absorbing mechanism proper. Figure 3 is a vertical transverse sectional view of the shock absorbing mechanism proper corresponding substantially to the line 3—3 of Figure 1. Figure 4 is a partial vertical longitudinal sectional view taken on the line 4—4 of Figure 2. And Figures 5, 6, 7 and 8 are detail perspectives of one of the wedge elements, one of the keen angle friction shoes, one of the side liners and one of the top liners of the shell, respectively.

In said drawings, 10—10 denote the usual channel draft sills of a car underframe, to the inner faces of which are secured front stop lugs 11 and rear stop lugs 12. A portion of a drawbar is indicated at 13, the same being operatively associated with the shock absorbing mechanism proper by a hooded cast yoke 14, the shock absorbing mechanism being disposed within the yoke as is also a front main follower 15. The yoke and parts therewithin are supported in operative position by a detachable saddle plate 16.

The improved shock absorbing mechanism proper, as shown, comprises, broadly, a combined friction shell and spring cage casting A; twin arranged springs B—B; a spring follower C; two sets of cooperable friction shoes and wedge, each set including a wedge D, a blunt angle friction shoe E, and a keen angle friction shoe F; an anchor bar G; a retainer bolt H; and a locking plate J.

The friction shell and cage casting A, as shown, is of rectangular cross section having top and bottom walls 17—17, side walls 18—18 and integral back wall 19, the latter cooperating with the stop lugs 12 and functioning as the rear follower of the mechanism. The side walls 18 are relatively short so as to leave the major portion of the sides of the casting open to admit of the insertion and removal of the springs and spring follower C. The friction shell proper of the casting A is at the forward end thereof and in order to prolong the life of the shell, it is preferably provided with liners consisting of two side plates 20—20 and two top and bottom plates 21—21. The top and bottom plates 21 are each made flat throughout and are notched on their side edges as indicated at 22 and 23 and also on their rear edges as indicated at 24, for the purposes hereinafter described. Each plate 20 has an inner flat side 25 providing a longitudinally extending friction surface and on its outer side is formed with two spaced heavy or wide ribs 26—26, the latter seating in corresponding recesses 27—27 provided in the side walls 18. As will be noted from an inspection of Figure 1, by providing the recesses 27, the side walls are left with three inwardly extending ribs 28, 29 and 30. In assembling the liner plates, the two top and bottom plates 21 are first put in position, it being evident that the notches 22 and 23 therein will fit over the ribs 28 and 29 and the rear edges 31 of the plates 21 will bear against the ribs 30 of the casting A. After the two plates 21 are in position, the side plates 20 are then put in laterally with the heavy ribs 26 thereof fitting within the recesses 27. In this manner, after the friction elements are inserted, it is evident that the plates 20 will be held in position and the plates 20 in turn will hold the plates 21 in position and all the plates will be securely locked against either inward or outward movement with respect to the casting A. The friction surfaces 25 will be converged at a comparatively small angle, inwardly of the shell, as shown in Figure 1.

The springs B are in twin arrangement and each preferably consists of an outer heavy coil and an inner lighter nested coil. Said springs bear, at their front ends, on the back wall 19 of the casting A and at their forward ends upon the spring follower C.

As hereinbefore set forth, two sets of friction devices are employed to cooperate with the shell, each set including a pair of friction shoes and an interposed pressure-transmitting wedge. The angle of engagement of the faces of one shoe and wedge of a set is arranged relatively acute with respect to the axis of the mechanism whereas the angle of the engaging faces of the other shoe and wedge of the same set, is arranged at a relatively blunt releasing angle with respect to the axis of the mechanism, as described more in detail hereinafter. The two sets of friction devices are, however, oppositely arranged, that is, the cooperating keen angle faces of one set are on one side of the mechanism and the cooperating keen angle faces of the other set are on the opposite side of the axis of the mechanism, one set occupying the lower half of the shell and the other set the upper half thereof. With this exception, it will only be necessary to describe in detail the arrangement of one set of devices, except as to certain features resulting from the opposite arrangement of the sets.

The friction shoes E and F of each set, while of generally similar construction, differ with respect to their inclined faces. Each said shoe is provided on its exterior with a flat friction surface 32 cooperable with the corresponding adjacent friction surface 25 of the shell. On its inner side, each shoe F is formed with an inclined face 33 which extends at a relatively acute or keen wedge angle with respect to the axis of the shell or center line of draft. Each shoe E is provided on its inner side with an inclined face 34 which extends at a relatively blunt and releasing angle with respect to the axis of the shell. Each wedge D is formed with correspondingly inclined faces 133 and 134. As hereinbefore described, it is evident that the sets of faces 33 and 133 will be on one side of the axis and the other set of faces 33 and 133 will be on the opposite side of the axis, as best indicated in Figure 1 where one set of faces is shown in full lines and the other set in dotted lines.

All of the shoes E and F are provided with rearward extensions 35 which bear upon the front face of the follower C.

The two wedges D are provided with flat bearing faces 36 at their outer ends adapted to be engaged by the front follower 15. The two wedges D are also provided with complemental semi-cylindrical recesses 37 to accommodate therewithin a circular heavy plate 38, when the parts are assembled, said plate 38 being centrally apertured to accommodate the retainer bolt H. The wedges D are also complementally recessed as indicated at 39 and 40 forwardly and rearwardly of the recesses 37, as best shown in Figure 5, to provide the necessary clearance for the nut on the bolt and the shank of the bolt, respectively. The head end of the bolt is passed through the central opening 41 provided in the anchor bar G. The latter has its ends engaging within the notches 24 of the top and bottom plates 21, so that said anchor bar G is limited in its forward movement but is free to move rearwardly, thus enabling me to use the retainer bolt to hold all the parts in assembled relation and to place the springs under initial compression.

The faces 34 and 134 of the shoes E and wedges D, respectively, are extended at such a blunt angle with respect to the axis of the mechanism as to prevent any substantial wedging, sliding or spreading action between the wedges D and shoes E from forces transmitted substantially longitudinally or parallel to the axis of the mechanism in either buff or draft. The angle of said faces 34 and 134 will vary in accordance with the materials employed and the slight taper of the shell will be such that it has very little, if any, wedging effect or, stated in another manner, may be said to be of substantially non-wedging effect during the compression stroke so far as buffing or pulling forces parallel or approximately parallel to the axis are concerned. The angle or inclination of the faces 33 and 133 will be made relatively acute and, in fact, much more acute than has heretofore been deemed successfully possible in a friction mechanism wherein the wedging or spreading action is imposed directly by a single pressure-transmitting wedge on opposed friction shoes proper and the reason that I am enabled to make the angle of said faces 33 and 133 so acute is that the release is not initially effective between said faces, as hereinafter explained.

The operation is as follows, assuming a buffing compression stroke. The two wedges D will be forced rearwardly or inwardly of the shell and the wedging or spreading effect from the two wedges D will occur entirely or substantially entirely on the two sets of cooperating faces 33 and 133, sliding or wedging action on the faces 34 and 134 being entirely negligible. Obviously, there will be an equal reaction in each set of the friction devices which will force the wedge D transversely against the shoe E so that the pressure between the shoes E and F of each set and the shell will be equalized. In the carrying out of my invention, the capacity of the spring will afford some resistance, but the greater part of the resistance is obtained purely by the friction generated between the shoes and shell, the spring B performing the function of returning or restoring the friction elements when they are released.

At the end of the compression stroke and upon removal of the actuating force, it is evident that tremendous forces will be stored up in the friction shell which has necessarily been expanded to some extent. Consequently, the shell will contract and the forces therefrom will be exerted radially inwardly on the shoes. Considering first the contraction of the shell with respect to the release action, it is obvious that the faces 33 and 133 extend at a relatively blunt or non-releasing angle with respect to such radial forces and, consequently, the faces 33 and 133 are not effective during initial release. Conversely, the faces 34 and 134 which are of short blunt releasing angle, oppose no effective resistance or sticking action to the radially inwardly contracting forces of the shell and hence said faces 34 act as wedges at this time to functionally free the wedges D from the shoes F or otherwise leaving loose or loosening the wedge, whereupon the groups of friction elements collapse sufficiently for the spring to restore all parts to normal position, the parts properly positioning themselves with respect to each other at the end of the release action, inasmuch as there is sufficient looseness to permit thereof. Irrespective of the contracting forces of the shell and considering the wedges D at the moment when the buffing or compression forces cease, said wedges D are free to drop away from the shoes E, inasmuch as the faces 34 of the shoes E oppose no resistance thereto. The initial collapse or break in the friction devices, therefore, occurs between the faces 34 and 134. Furthermore, the taper of the shell, hereinbefore described, is of further assistance in insuring restoration of all of the parts to normal position, inasmuch as the friction parts, when collapsed or released, may readily be projected outwardly under the influence of the spring resistance without danger of the shoes jamming with the shell walls.

Due to the unsymmetrical arrangement of faces 33 and 133 on the one hand and 34 and 134 on the other hand and because of the substantially non-wedging action on the faces 34 and 134 during a compression stroke, there may be a tendency of the wedge D and blunt shoe E of each set to advance longitudinally inwardly of the shell with respect to the keen angle shoe F of the corresponding set. This in turn, were there only one set of wedging devices, would tend to induce tilting of the spring follower and hence cause a slightly unbalanced spring pressure on the keen and blunt angle shoes of each set. However, by arranging the two sets of friction devices oppositely, should any action such as just mentioned tend to occur, it is evident that the tilting action of the spring follower will be eliminated or neutralized since it will be actuated uniformly on two diagonally disposed corners. Should the spring follower, by the action mentioned, be compelled to move slightly away from the inner ends of the keen angle shoes F, nevertheless, no detrimental results will follow, inasmuch as the keen angle shoes will still be frictionally restrained while they are being forced inwardly of the shell and hence cannot be freed from the shell or rendered loose, this result following not only by reason of the spreading action against the shoes F which creates the friction between them and the shell but also on account of the inward taper of the shell. In the release action, it is evident that, after the parts have collapsed, the spring follower will assist in automatically adjusting the relative positions of the keen and blunt shoes inasmuch as all four will ultimately be picked up and moved to their final release position by the follower C.

Although I have herein shown and described what I now consider the preferred manner of carrying out the invention, the same is merely illustrative and by way of description only and not by way of limitation. All changes and modifications are contemplated that come within the scope of the claims appended hereto.

I claim:

1. In a friction draft gear, in combination: friction means adapted to be mounted on a car and held stationary under buff; a spring resistance; oppositely arranged sets of movable means between which and said stationary friction means, cushioning friction is caused by buffing strains transmitted to said movable means, each of said movable means including, two parts having faces arranged at different angles to the axis of the gear, the said angles together providing a releasing angle; and oppositely arranged wedging means to receive said buffing strains and to cooperate with said respective releasing angles to apply pressure to said two parts of each movable means and to freely release therefrom on the cessation of said strains, one of said faces of each means being arranged at a relatively acute angle to said axis so that the wedging means create high frictional resistance.

2. In a friction draft gear, in combination: friction means adapted to be mounted on a car and held stationary under buff, said means having longitudinally slightly converged friction surfaces; a spring resistance; two sets of oppositely arranged movable means each having friction surfaces cooperable with said first named friction surfaces and between which and said stationary friction means, cushioning friction is caused by buffing strains transmitted to said movable means, each of said movable means including two parts having faces arranged at different angles to the axis of the gear, the said angles together forming a releasing angle; and oppositely disposed wedging means arranged to receive said buffing strains and to cooperate with the said faces of each respective movable means defining said releasing angle to apply pressure to said two parts and to freely release therefrom on the cessation of said strains, one of said faces of each set being arranged at a relatively acute angle to said axis so that the wedging means will cause high frictional cushioning resistance.

3. In a friction shock absorbing mechanism, the combination with a friction member provided with longitudinally extending friction surfaces; of a spring resistance; oppositely arranged sets of friction elements having also longitudinally extending friction surfaces cooperable with the friction surfaces of said member, one element of each set having a face inclined at a keen wedging angle relative to the axis of said member and another element of each set having a face inclined at a relatively obtuse releasing angle relative to the axis of said member; and a one-piece member for each of said sets of friction elements, each said one-piece member having inclined faces co-acting directly with the said inclined faces of the elements of the respective set.

4. In a friction shock absorbing mechanism, the combination with a friction member provided with longitudinally extending friction surfaces slightly converged in the direction of the length of the mechanism; of oppositely arranged sets of friction elements each having also longitudinally extending cooperating friction surfaces, one element of each set having a face inclined at a keen wedge angle with respect to the axis of said member and another element of each set having a face inclined at an obtuse releasing angle with respect to the axis of said member; a spring resistance; and a one-piece member cooperable with the elements of each set, each one-piece member having inclined faces co-acting directly with said inclined faces of the elements of the respective set.

5. In a friction shock absorbing mechanism, the combination with a friction shell provided with interior longitudinally extending friction surfaces; of a spring resistance; oppositely arranged pairs of friction shoes within said shell, one shoe of each pair having an inner face extending at a keen wedge-acting angle with respect to the axis of the shell and the other shoe of each pair having an inner face extending at a different and obtuse releasing angle with respect to said axis; and a one-piece member associated with each pair of friction shoes, each said one-piece member having correspondingly inclined faces co-acting with said faces of the shoes of the respective set.

6. In a friction shock absorbing mechanism, the combination with a friction shell provided with interior longitudinally extending friction surfaces, converged inwardly of the shell; of a spring resistance; oppositely arranged pairs of friction shoes within said shell and frictionally cooperable with the surfaces thereof, one shoe of each pair having an inner face extending at a keen wedge-acting angle relative to the axis of the shell and the other shoe of each pair having an inner face extending at a different and obtuse releasing angle relative to said axis; and a one-piece member for each pair of said shoes, each said one-piece member having correspondingly inclined faces co-acting with said faces of the friction shoes of the respective set.

7. In a friction shock absorbing mechanism, the combination with a shell; of a spring resistance; oppositely arranged sets of friction shoes operating within the shell; a shock-transmitting wedge for each of said sets of friction shoes, each wedge operating between the shoes of the respective set, one shoe of each set having a wedge face at an angle which is acute and of high friction-creating capacity and non-releasing, and another shoe of each set opposing the acute angle shoe thereof having a face engaged by the wedge of the respective set at a wedge-releasing angle opposed to said wedge face of the first mentioned shoe of the respective set.

8. In a friction shock absorbing mechanism, the combination with a friction shell; of a spring resistance; oppositely arranged sets of friction shoes slidable within said shell; and a movable wedge for each set of friction shoes and disposed therebetween, the shoes of each set having inner faces inclined one to the other at an angle from within which the respective wedge is readily releasable upon discontinuance of the actuating compression force, the inner face of one of said shoes of each set being at an acute angle to create high frictional capacity in the mechanism and of such an acute angle per se that the initial collapse of the shoes of each set and cooperating wedge must necessarily occur on other faces.

9. In a friction shock absorbing mechanism, the combination with a friction shell having interior longitudinally extending friction surfaces converged inwardly of the shell; of a spring resistance; oppositely arranged sets of friction shoes, each set comprising opposed friction shoes frictionally cooperable with said surfaces of the shell; and pressure-receiving and transmitting wedging means associated with and extended between the shoes of each set, said means and shoes, of each set, on one side of the axis of the shell having engaging faces extending at an acute angle with respect to said axis, said means and opposed shoe, of each set, on the other side of the axis having cooperating faces inclined at a releasing more obtuse angle with respect to said axis.

10. In a friction shock absorbing mechanism, the combination with a friction shell having interior opposed longitudinally extending friction surfaces; of a spring resistance; a spring follower at the end of said spring resistance adjacent the inner end of the shell; and oppositely arranged sets of friction devices cooperable with said shell, each set of friction devices including opposed friction shoes and a wedge therebetween, said wedge and one shoe having keen angle wedge engagement and the wedge and an opposed shoe having blunt angle engagement, the keen angle shoes of the two sets being diagonally disposed within the shell, all shoes having engagement normally with said spring follower.

11. In a friction shock absorbing mechanism, the combination with a casting having a friction shell at one end thereof and a spring cage at the other end, said shell being provided with inwardly converged opposed friction surfaces; of twin arranged springs within the cage; a spring follower at the ends of said springs adjacent the shell; and two sets of friction devices within the shell, each set including opposed friction shoes and an interposed wedge, said wedge having keen angle engagement with one shoe and blunt angle engagement with an opposed shoe, the keen angle shoe of one set being disposed on the opposite side of the axis of the mechanism to the keen angle shoe of the other set.

In witness that I claim the foregoing I have hereunto subscribed my name this 22nd day of July 1922.

JOHN F. O'CONNOR.

Witnesses:
 UNA C. GRIGSBY,
 ANN BAKER.